INVENTORS.
LELAN R. SQUIER
ROBERT H. STEIDL

AGENT

June 2, 1964  L. R. SQUIER ETAL  3,135,465
AXONOMETRIC COMPUTER SLIDE RULE
Filed Nov. 30, 1962  4 Sheets-Sheet 2

INVENTORS.
LELAN R. SQUIER
ROBERT H. STEIDL
BY
L. E. Carnahan
AGENT

INVENTORS.
LELAN R. SQUIER
ROBERT H. STEIDL
BY

AGENT

INVENTORS.
LELAN R. SQUIER
ROBERT H. STEIDL
BY

AGENT

United States Patent Office 3,135,465
Patented June 2, 1964

3,135,465
AXONOMETRIC COMPUTER SLIDE RULE
Lelan R. Squier and Robert H. Steidl, Seattle, Wash.,
assignors to The Boeing Company, Seattle, Wash., a
corporation of Delaware
Filed Nov. 30, 1962, Ser. No. 241,271
2 Claims. (Cl. 235—70)

This invention relates to the draftman's art, and more particularly to a tool for use in axonometric projection.

In axonometric projection, i.e., isometric, dimetric and trimetric, distances are foreshortened and angles are distorted. Nevertheless, all parts of proper axonometric projections are drawn in proportion to all other parts.

The tool of this invention is in the nature of a computer whereby the correct proportions of the plane projections of lines and angles in space, with relation to other such lines and angles, can be accurately determined. Thereby the draftsman is enabled to draw the object on the picture plane, regardless of its altitude in space or relative to the picture plane, in accurate proportion. Conversely, having such an accurately proportioned axonometric projection, there can be scaled therefrom the true distances and angles of the object. The net result is the ability to illustrate accurately in a single axonometric projection, and to use that projection for scaling off, that which otherwise would require a plurality of different orthographic projections, and this despite great complexity or irregularity in the projected object, or the inclination of the line of sight to the object.

Conventional engineering drawings are orthographic projections with a plan view, a front view and a side view. If the three views of a cube were shown in orthographic projections the front, side and plan views would each appear as a square. The lines would appear in their true proportionate (in this, equal) lengths, and the angles would be of true magnitude, i.e., all would be right angles.

In drawing complex mechanical assemblies for illustration, with tubing and other parts, it is often desirable to draw the three views in one projection, so that it may be more clearly seen how each part is disposed within the assembly, such an illustration being known as an axonometric projection.

The difficult part of an axonometric projection is that the lines do not appear in their true proportionate length, angles do not appear in their true magnitude, and figures are distorted from their true shape. If a cube were shown axonometrically, three cube faces would all appear in the same picture. But even though all margins of all sides of the cube are in reality equal and all the angles are in reality right angles, the side margins would probably be drawn at the picture plane in different lengths, and angles would be drawn as other than right angles. A circle drawn on the side of a cube would appear as an ellipse, a square side as a parallelogram. Again, if the cube were to be rotated in space, about a horizontal or a vertical axis, or both, into a new position, the side margins at the picture plane would change in length and the angles would change in magnitude.

The conventional method of constructing an axonometric drawing involved several steps of using proportional triangles, ellipse tables, dividers, ruler and a protractor. Construction lines representing each different plane illustrated must be drawn on a piece of work paper and several mechanical steps must be performed to obtain the apparent length of lines and magnitude of the angles. To obtain actual dimensions and angles by scaling off an axonometric projection entails a tedious reversal of such steps.

Although much effort and time has been devoted to developing means to eliminate this tedious time consuming work, very little progress has been made. The more recent effort, prior to this invention, has been the development of a manual entitled, "The Axonometric Computing System," by Lelan R. Squier, co-inventor of the instant invention, which sets forth tables that define all functions necessary to permit all of the drawing of the above types of drawings in increment of 1°. Based on the tables of this manual, a computer has been developed by Arthur L. Kero, co-pending U.S. patent application Serial No. 822,299, now Patent No. 3,074,630, filed June 23, 1959, and assigned to the assignee of this invention.

The instant invention allows the user to find all of his answers for any angle of projection and unlike the computer of the above-identified patent application, it can be read more accurately at every angle of tilt or rotation. The invention provides a simple accurate means of obtaining rotated angles, length of line, adding or subtracting angles, tilts and slopes, thus providing a simple means to assist in producing isometric, dimetric, and trimetric drawings.

Therefore, an object of this invention is to provide a simple and speedy means to make axonometric projections from orthographic projections or from actual physical dimensions, or conversely, to enable the determination of true values of lines and angles which are shown axonometrically.

A further object of this invention is to determine the apparent length and proper direction of a line at the picture plane when the object is drawn axonometrically, and the converse, or the apparent angularity and location of two lines when drawn axonometrically, and the converse, regardless of the rotated positions of such lines in space and relative to the picture plane.

A still further object of the invention is to determine the direction and angle of the axes of an ellipse, which represents a circle, and the lengths of such axes, in an axonometric drawing.

These and other objects of the invention not specifically set forth above will become readily apparent from the accompanying description and drawings in which.

For ease of explanation, a cube in a given attitude will be taken as the object to be illustrated axonometrically, and the extension of the principles illustrated to more complex shapes and to other attitudes, will be clear from the principles so illustrated, and described herein.

Understanding of the invention and its underlying principles will best be promoted by describing the several components and their structural relationships, and then by following through the solution of typical problems in producing an axonometric projection step by step, to illustrate how the slide rule functions.

The axonometric computer is in the form of a slide rule and will locate any point in space, provide foreshortened lengths of lines, angular rotations, and determine the elliptical shape of foreshortened circles for any required degree for isometric, dimetric, and trimetric drawings.

The axonometric slide rule consists primarily of curves, standard protractor conversion scales, cosine scales, log scales, and a diagonal intersector line.

Physically the slide rule comprises four main components, i.e., (I) a flat elongated body portion indicated generally at 1, said body portion being covered on the front and back sides by a clear plastic or other transparent material which permits reading of scales printed on the body portion; (II) a main slider generally indicated at 2 slidably positioned in and with respect to body porton 1, said main slider being provided with lines, curves and scales more fully defined hereinafter; (III) a second slider generally indicated at 3 slidably positioned in and with respect to body portion 1, said second slider being provided with scales more fully described hereinbelow; and (IV) a third slider generally indicated at 4 and having thereon a hairline 5, said slide being slidably positioned over main body portion 1 whereby hairline 5 can be moved to any desired location on body portion 1 as described hereinafter.

In actual practice the front side of the rule (FIG. 1) and the back side (FIGS. 2A and 2B) are the same size. However, for purpose of illustration and clarification the back side has been shown greater in length.

Figure 1:
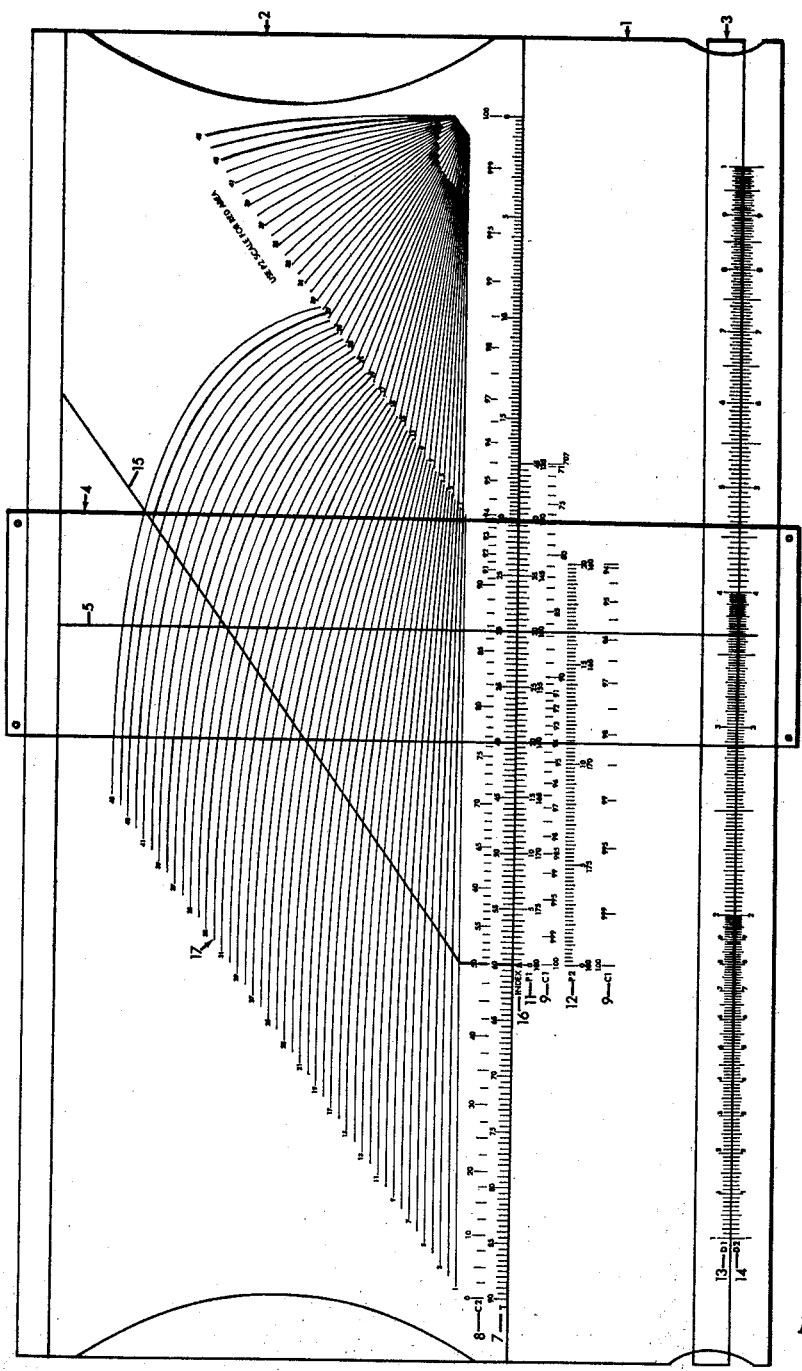
FIGURE 1 shows the front side of the computer slide rule of the invention.
Figure 2A:
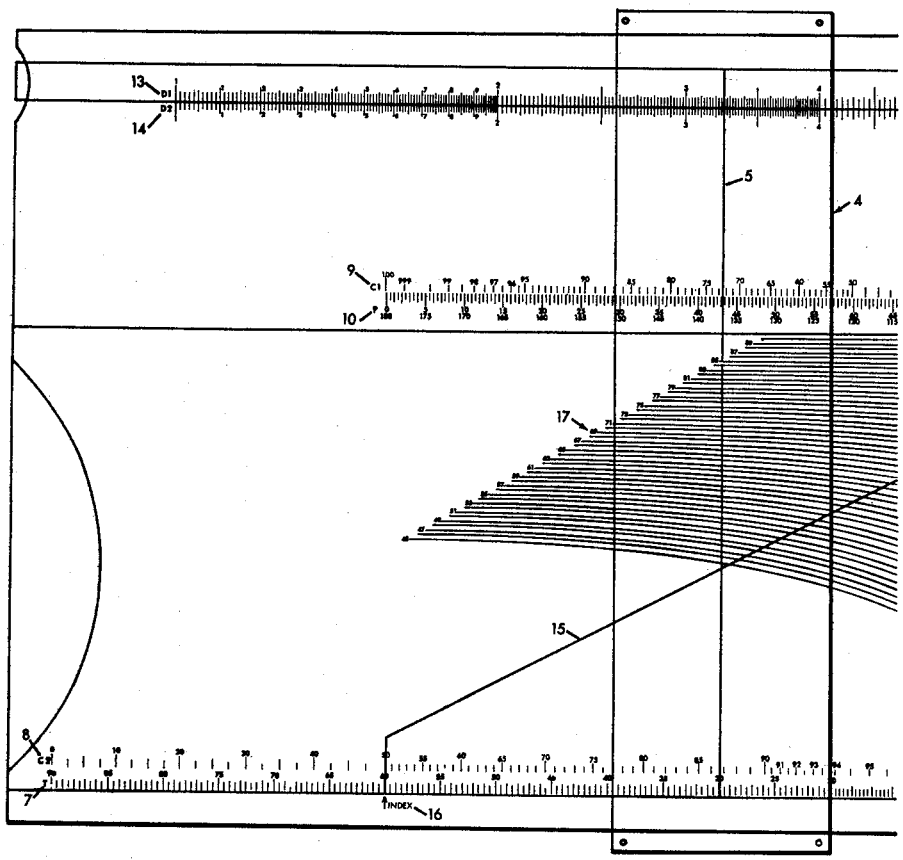
FIGURES 2A and 2B show the back side of the slide rule.
Figure 2B:
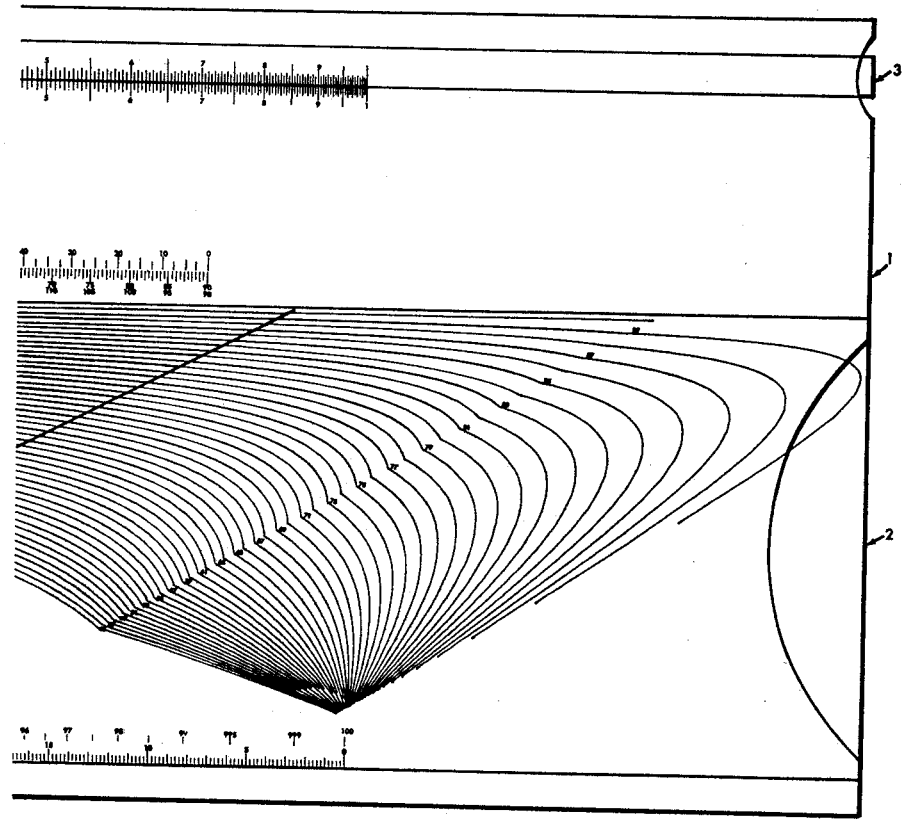

Referring now to the details of the slide rule as shown in FIGS. 1, 2A and 2B, positioned on both the front and back sides of slider 2 is a T-scale (incline plane scale) 7 which indicates the degree of a plane raised from its horizontal position, or the degree of the ellipse on the plane of the drawing. Also positioned on both sides of slider 2 and directly above the T-scale is a C2-scale 8.

On the front side of slide rule body portion 1 are two C1-scales 9 and on the back side of the rule is another C1-scale 9. The C2-scales and C1-scales are cosine scales and are used to find the proportional unity length of all lines C2/C1.

Positioned on the back side of body portion and adjacent the C1-scale is a P-scale 10 (see FIGS. 2A and 2B). On the front side of the slide rule adjacent to and directly above the upper C1-scale is a P1-scale 11; while adjacent to and directly above the lower C1-scale is a P2-scale 12. The P-scale, P1-scale and P2-scale are standard protractor scales and are used for the base angles and as the key for angular measurement within the drawings.

Slide 3 is provided with a D1-scale 13 on both the front and back sides thereof. Positioned on body portion 1 adjacent to and directly below each D1-cale is a D2-scale 14. The D1-scales and D2-scales are log scales and are used for division to find the proportional unity length of lines.

Positioned on the transparent material of body portion 1 and on both the front and back sides is a diagonal intersector line 15, said intersector line extending in a first direction which is perpendicular to the T and C2 scales and then in a direction which is approximately 35° and 29° respectively from the T and C2 scales.

As shown in FIG. 1, each of the C1-scales, the P1-scale and the P2-scale are aligned on an index 16. The P-scale and the C1-scale on the back of the rule are also aligned on an index 16, as shown in FIG. 2A. While the D1 and D2 scales are not shown aligned on index 16, they can be if so desired.

In actual practice it is sometimes desirable to have the numerals of each C1 and C2 scale colored for clarity.

Slider 2 is also provided with a plurality of curves generally indicated at 17. In the drawings, some of the curves 17 appear as lines, this being due to the reduced scale of the drawings. Each curve 17 represents an elliptical degree at its meeting with intersector line 15 for an ellipse of the degree corresponding with the T-scale number set on the index 16.

On the front side of slider 2 the curves 17 appear as two sets of curves numbered from 1 through 45. Actually, the set of curves on the right side of the slider are the same curves as those on the left side but have been expanded for clarity. In actual practice the set of curves on the right side of the rule and the curves intermediate the numbered curves on the left side can be colored for further clarity. The P2-scale is used with the area 20° through 0° on the front side (see legend on FIG. 1).

The back side of slider 2 (see FIGS. 2A and 2B) is also provided with a plurality of curves 17 and these curves appear as two sets each numbered 45 through 90. Again, the set of curves on the right hand side are the same curves as those on the left hand side but expanded for clarity. The right hand set and the nunumbered curves of the left hand set can be colored for clarity in actual practice.

The curves 17 on the front and back sides of slider 2 represent elliptical degrees where they intersect with intersector line 15 for an ellipse of 0° through 90° corresponding with the T-scale number set on the index. Since the degrees for one quadrant of an ellipse are on the slide rule, only one quadrant is required because each ellipse is symmetrical.

As stated above, axonometric drawing is divided into 3 classes, i.e., isometric, dimetric and trimetric. These are mechanical drawing methods for converting the orthographic views of an engineering drawing into a single 3-dimensional view, thus producing a picture of the object represented by the engineering drawing. Because an object is turned and tilted forward so that 3 planes are seen all linear and angular measurement foreshortens.

Isometric is the most popular of the 3 classes and isometric fundamentals are taught in most mechanical drawing courses. The base angles for isometric drawing are established by use of a 30° triangle. The scales are known and are equal for each plane. However, isometric is only one of the infinite number of views that can be utilized in axonometric drawing. The base angles and scales are unknown for dimetric and trimetric views and must be developed.

The axonometric slide rule is applied to isometric drawing for angular and linear measurement for nonisometric lines ( lines that are not parallel with the isometric axes). As for all axonometric drawing, the slide rule must be used in conjunction with a standard protractor. It is recommended that a circular protractor, upon which an ellipse has been superimposed, be used with the slide rule. The ellipse is an aid for positioning the protractor correctly on the drawing; and is placed so that its minor axis is parallel to a line representing a perpendicular to the plane of the ellipse.

Figure 3:
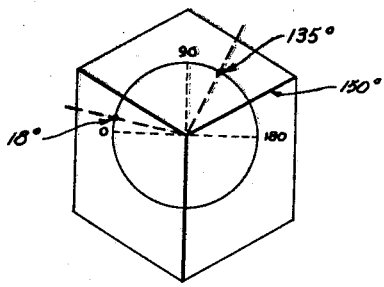
FIGURES 3-6 illustrate respective problems in isometric, dimetric and trimetric projections.
Figure 4:
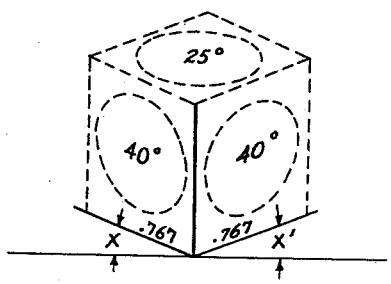
Figure 5:
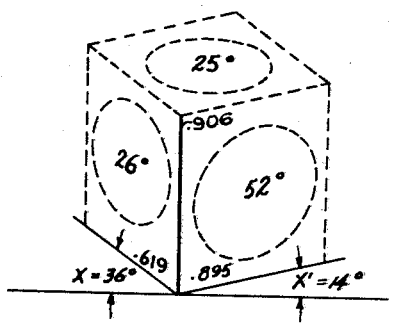

To illustrate how the slide rule functions, the following solutions of typical problems in producing axonometric projections are set forth step by step and shown in FIGS. 3 to 5.

Isometric application:

*Problem.*—Measure an angle of 15 degrees counter clockwise from the right horizontal isometric axis.

(1) Set slider 2 so that numeral 35 on T-scale 7 is on index 16.

(2) Set hairline 5 on P1-scale 11 corresponding to protractor reading of 150°.

(3) Find the curve 17 and intersection of diagonal intersector line 15 that is closest to hairline 5. This will be the 45° curve.

(4) Add 15° to 45°, this sum being 60°. Turn to the back of the rule and following the 60° curve of curves 17 until it is intersected by intersector line 15. Move hairline 5 to this intersection.

(5) The reading at hair line 5 on P-scale 10 is the new protractor reading of 135°, for the 15° angle (see FIG. 3).

(6) Find the cosine value for the 60° curve by reading the C2-scale 8 on the back of the rule at the 60 mark on T-scale 7, the value being 0.5.

(7) Find the C1-scale 9 reading that is above the 135 on P-scale 10, the reading being 0.707.

(8) Divide on the D1-scale 13 and the D2-scale 14 with the C2 value on the D2-scale and the C1 value on the D1-scale, thus 0.5 divided by 0.707 is 0.706.

(9) The quotient 0.706 is the proportional length of the rotated line.

(10) Find the value 0.706 on either the C1 or C2 scales and the reading from this point on the corresponding P1 or P2 scales is the degree of ellipse to use on this line, this being 45°.

(11) To establish a line that represents a 90° angle to the new line, find the complementary angle curve of curves 17. In this example it is 30°.

(12) Repeat steps 4 through 11 using this value.

Dimetric application:

Dimetric drawing requires the development of cubes that represent the drawing planes. The base angles, scales, and degree of ellipses must be established for all dimetrics. For this example a 25° forward tilt was selected, which means that a 25° ellipse will be on the top plane.

(1) Set slider 2 with the 25 mark of the T-scale on the index 16. The slider is always set on the degree of the amount of forward tilt of the object.

(2) The reading on the C2-scale 8 at the 25 of the T-scale 7 is 0.906 and is proportional unity length of the vertical axis (see FIG. 4).

(3) Dimetrics are rotated 45° about the vertical axis so the 45° curve of curves 17 must be used. Find the intersection of the 45° curve and the intersector line.

(4) Move the hairline 5 to this intersection and the reading on the P1-scale 11 of 23° is the base angle X (FIG. 4).

(5) The base angles X and X¹ are equal so this angle applies to both. The horizontal axes are of equal proportional unity length so if the length of one is determined, it applies to both.

(6) At 45 on the T-scale 7, the reading from the C2-scale 8 of 0.707 is set on the D2-scale 14 and at the 23° reading on the P1-scale 11, the reading of 0.92 on the C1-scale 9 is set on the D1-scale 13. The quotient of 0.767 is the proportional unity length of the horizontal axes.

(7) Find 0.767 on either the C1 or C2 scale and from this point the reading on the corresponding P, P1 or P2 scale of 40° is the degree of ellipse to use on planes representing perpendiculars to the lines.

(8) Angular and linear measurement within the drawing is accomplished in the same manner as described above for isometric application.

Trimetric application:

Trimetric also requires the development of cubes that represent the drawing planes. The base angles, scales, and degree of ellipses must be established for all trimetrics. For this example a forward tilt of 25° was selected and a rotation of 30° about the vertical axis.

(1) Set the slider 2 with the 25 mark of the T-scale 7 on index 16. The reading at this point on the C2-scale 8 is the proportional unity length of the vertical axis (see FIG. 5), this being 0.906.

(2) As the rotation is 30° find the intersection of the 30° curve of curves 17 and the intersector line 15.

(3) Set the hairline 5 at this point and the reading for the second protractor quadrant on the P1-scale 11 is 166° which is the position of the right horizontal axis (the degree of the right base angle X¹ of FIG. 5).

(4) At 30 on the T-scale 7 the reading of 0.865 on the C2-scale 8 is set on the D2-scale 14 and from the 166° reading on the P1-scale 11 the reading of 0.97 on the C1-scale 9 is set on the D1-scale 13. The quotient of 0.895 is the proportional unity length of this horizontal axis.

(5) The degree of ellipse on the plane perpendicular to this axis is the reading on any corresponding protractor scale to 0.895 on either the C1 or C2 scales, the reading being 26.9°.

(6) The other horizontal axis is found by establishing a 90° equivalent angle. The complement of 30 is 60 so the 60° curve of curves 17 is used.

(7) Find the intersection of the 60° curve and the intersector line.

(8) Set the hairline on this point and the reading of the first protractor quadrant on the P-scale 10 is 36° which is the base angle X and position of the left horizontal axis (see FIG. 5).

(9) The proportional unity length of this axis (0.617) and the degree of ellipse (52°) on the plane perpendicular to the axis is found by repeating steps 4 and 5.

As stated above, when there is an accurately proportioned axonometric projection, the true distances and angles of the object can be scaled therefrom by the slide rule of the instant invention. This procedure is set forth by the following example and illustrated in FIG. 6.

To convert foreshortened angular measurement into true angular measurement:

(1) Set slider 2 on index 16 reading corresponding with the plane of ellipse.

Figure 6:
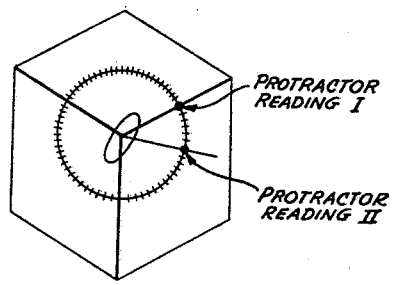

(2) Set hairline 5 on P1-scale 11 reading corresponding to protractor reading I in FIG. 6.

(3) Find the curve of curves 17 which intersect with diagonal line 15 closest to hairline 5.

(4) Repeat steps 2 and 3 for protractor reading II in FIGURE 6.

(5) The *difference* from the numbers of the curves is the true angular measurement.

To convert foreshortened linear measurement to true measurement, measure the foreshortened line from the picture. Divide its length by the foreshortened unity length.

There are the same number of true units as there are foreshortened units to the line.

It has thus been shown that the instant invention provides a quick and accurate means for determining the correct proportions of the plane projections of lines and angles in space with relation to other such lines and angles, thereby eliminating the tedious steps of the conventional methods and thus greatly reducing the time required in the production of isometric, dimetric and trimetric drawings.

While the invention has been represented and described by a single representative and practical form, it is to be understood that this form is given by way of example, and not of limitation, and no restriction is to be implied from the use of the single exemplary form, other than as appears clearly in the appended claims.

What we claim is:

1. A drafting computer for axonometric drawings comprising a body, a pair of longitudinal sliders mounted and longitudinally slidable with respect to said body, an incline plane scale on each side of one of said sliders adjacent one longitudinal edge thereof, a first cosine scale on each side of said one slider adjacent said incline plane scales, at least one family of curves on each side of said one slider adjacent said first cosine scales; an index on each side of said body adjacent said incline plane scales of said one slider, a diagonal line on each side of said body extending across said one slider and intersecting with a line which extends vertically from said indexes; a first protractor scale aligned on each side of said body with said indexes, one of said first protractor scales being adjacent one of said incline plane scales of said one slider, a second cosine scale on each side of said body adjacent said first protractor scales and aligned with said indexes, a second protractor scale on one side of said body adjacent one of said second cosine scales and aligned with one of said indexes, a third cosine scale on one side of said body adjacent said second protractor scale and aligned with said one of said indexes; a first logarithmic scale on each side of the other of said longitudinal sliders adjacent one longitudinal edge thereof; a second logarithmic scale on each side of said body adjacent said first logarithmic scales of said other slider; and means including a hairline on each side of said body and longitudinally slidable over said body and said pair of sliders, whereby each curve of each of said family of curves represents an elliptical degree at the intersection thereof with the associated diagonal line on said body and with the associated hairline for an ellipse of a desired degree on the associated incline plane scale of said one of said sliders when such degree is adjacent the associated index on said body, and whereby movement of said one of said sliders with respect to said body aligns a point on one of said first cosine scales with respect to a point on one of said second cosine scales or with respect to a point on said third cosine scale for finding the proportional unity length of all lines by movement of said associated hairline to a desired point on said body, and whereby movement of said hairline with respect to said body aligns certain of said cosine scales with certain of said protractor scales for determining base angles, and whereby movement of the other of said longitudinal sliders with respect to said body aligns a point on one of said first logarithmic scales with a point on one of said second logarithmic scales wherein movement of the associated hairline to a point on said body determines the proportional unity length of lines.

2. A computer for axonometric drawings comprising a body, a longitudinal slider mounted and longitudinally slidable with respect to said body, an incline plane scale on each side of said slider adjacent one longitudinal edge thereof, a first cosine scale on each side of said slider adjacent said incline plane scales, at least one family of curves on each side of said slider adjacent said first cosine scales; an index on each side of said body adjacent said incline plane scales of said slider, a diagonal line on each side of said body extending across said one slider and intersecting with a line which extends vertically from said indexes; a first protractor scale aligned on each side of said body with said indexes, one of said first protractor scales being adjacent one of said incline plane scales of said slider, a second cosine scale on each side of said body adjacent said first protractor scales and aligned with said indexes, a second protractor scale on one side of said body adjacent one of said second cosine scales and aligned with one of said indexes, a third cosine scale on one side of said body adjacent said second protractor scale and aligned with said one of said indexes; and slider means including a hairline on each side of said body and longitudinally slidable over said body and said slider, whereby each curve of each of said family of curves represents an elliptical degree at the intersection thereof with the associated diagonal line on said body and with the associated hairline for an ellipse of a desired degree on the associated incline plane scale of said slider when such degree is adjacent the associated index on said body, and whereby movement of said slider with respect to said body aligns a point on one of said first cosine scales with respect to a point on one of said second cosine scales or with respect to a point on said third cosine scale for finding the proportional unity length of all lines by movement of said associated hairline to a desired point on said body, and whereby movement of one of said hairlines with respect to said body aligns certain of said cosine scales with certain of said protractor scales for determining base angles.

References Cited in the file of this patent

UNITED STATES PATENTS

| | | |
|---|---|---|
| 1,382,011 | O'Neill et al. | June 21, 1921 |
| 1,520,105 | Bicknell | Dec. 23, 1924 |
| 2,585,595 | Spencer | Feb. 12, 1952 |

FOREIGN PATENTS

| | | |
|---|---|---|
| 500,663 | France | Jan. 2, 1920 |

OTHER REFERENCES

Article, "Air Flow in Supersonic Flight Speed Calculations," The Journal of the Franklin Institute, April 1950.